Patented June 13, 1933

1,913,367

UNITED STATES PATENT OFFICE

WILLIAM S. CALCOTT AND WILLIAM A. DOUGLASS, OF PENNS GROVE, NEW JERSEY, AND HERBERT W. WALKER, OF WILMINGTON, DELAWARE, ASSIGNORS TO E. I. DU PONT DE NEMOURS & COMPANY, OF WILMINGTON, DELAWARE, A CORPORATION OF DELAWARE

PRESERVATION OF OILS, FATS, FATTY OILS, FATTY ESTERS, FATTY ACIDS, FATTY ACID SALTS, AND RELATED COMPOUNDS

No Drawing. Application filed December 18, 1929. Serial No. 415,014.

This invention relates to the treatment of auto-oxidizable substances such as oils, fats, fatty oils, fatty esters, fatty acids and salts of fatty acids to retard deterioration and development of rancidification. More particularly it pertains to the addition of organic compounds to such substances in order to accomplish these results. Specifically, the incorporation of diaryl or diaralkyl compounds, such as hydroxy diaryl alkanes into the material to be preserved is contemplated.

Butter, lard, cocoanut oil and other animal and vegetable fats and fatty oils, together with soap, the sodium or potassium salts of the fatty acids contained in these fats and fatty oils, tend to develop an objectionable rancid odor and taste on exposure to air under ordinary conditions. This deterioration is due to the oxidation of the fatty acid part of the fat or soap molecule by atmospheric oxygen. The oxide derivatives which are first formed become decomposed or altered and produce substances having a rancid odor and taste.

Some work has been done in the fat preservation field as shown by U. S. P. 1,542,438 to Divine, wherein aniline, alpha naphthylamine, para phenylene-diamine, diphenylamine and hexamethylenetetramine are added to soap. In U. S. P. 1,575,529 to Bollman soya bean lecithin is added to edible oils. Other improvements in the keeping quality of auto-oxidizable substances are claimed in U. S. P. 1,672,657 to Powell according to which the condensation product of an aromatic amine and an aliphatic aldehyde is added to the material to be preserved. The foreign patent art also discloses work along this line as evidenced by B. P. 181,365 to Moureu and DuFraisse who employ the phenols such as pyrogallol, guaiacol, and hydroquinone as stabilizers for auto-oxidizable substances. In B. P. 208,189 to Lever Bros. the phenols of the types hydroquinone, guaiacol and resorcinol are used to prevent deterioration of whale oil. Rechburg, Braun and Oetermann in D. R. P. 254,303 disclose sulfur and pyrogallol for the preservation of oils and fats. Boehringer in D. R. P. 308,408 discloses alkali lactates as suitable stabilizers for margarine, butter and lard. Many of the compounds heretofore employed, however, have been open to the objection that they either discolor the product to be preserved or form compounds that have this objectionable property. Certain compounds of the prior art impart to the product in which they are incorporated a distinctive odor. Other proposed preventives are actually ineffectual or are effective only for a short time.

This invention has as an object the preservation of fats, fatty oils, fatty esters, fatty acids, fatty acid salts and the like. A further object of this invention is to insure the retention of the original odors of these materials for indefinite periods. Still further objects are to prevent or retard the auto-oxidation of materials of this nature, to keep the materials sweet (in the sense of the odors given off) for a long period, to maintain the original chemical and physical states for extended periods, to prevent reaction of these substances or their constituent parts with the atmosphere or its constituent parts such as oxygen, to insure retention of the original properties of these substances without discoloring or imparting objectionable odors thereto, to prevent oxygen absorption by the materials to be preserved and generally overcome the objectionable features of the prior art. Other objects will appear hereinafter.

These objects are accomplished by the invention herein disclosed which is related to the invention of application #391,706 filed September 10, 1929, by the same inventors in that it involves further work in the same field. In that application the preservation of oils, fats, etc., by the addition thereto of diaryl compounds is disclosed and in the examples set forth the aryl groups are directly connected. It has now been found that preservation may also be accomplished by compounds containing a plurality of aryl or aralkyl groups connected through or to an intermediary, such as, for example, an alkane, amino or oxygen radical. In compounds of this class, those having a hydroxy, ethoxy or amino radical attached to an aryl group are particularly effective.

According to this invention members of the hydroxy diaryl alkane class of compounds are incorporated into the substances to be preserved. These incorporated materials act as anti-oxidants to prevent or retard the decomposition and rancidification and prevent combination with or absorption of oxygen. The general formula of the preferred compounds used is

in which R and R' are aryl or aralkyl nuclei which may be alike or different and Y is either hydrogen, hydroxy or alkoxy. The retarding agents may be incorporated in the oil or fat in any suitable manner as, for example, by mixing, and at any time found preferable as, for instance, before or during preparation or in the natural or ordinary state. By way of illustrating our invention the following selected examples are given.

*Example I*

One tenth of 1% of di-2-naphthol methane was incorporated into ordinary commercial lard and the sample exposed to the action of the atmosphere at room temperature along with an untreated control sample of the same lard. After 7 days the control sample possessed a rancid odor and gave a positive test for rancidity with the phloroglucinol Kreis reagent. On the other hand, the stabilized lard containing di-2-naphthol methane remained sweet to smell and gave no indication of rancidity by the Kreis color reaction with phloroglucinol. For the 3 succeeding days the treated lard remained stable and free from any rancid condition to the extent that it was essentially unchanged after the ten day test.

*Example II* p-hydroxy diphenylmethane was added to a sample of lard up to a concentration of 0.1% and its effect on the development of rancidity observed, as in Example I. While the control sample underwent deterioration with attendant rancidity after 7 days exposure as determined by odor and chemical test using the Kreis color reagent, the lard containing p-hydroxy diphenylmethane was distinctly sweet to smell and gave a negative Kreis test, indicating stabilization of the lard by the antioxidant with protection against spoilage and the development of rancidity.

*Example III*

If 0.05% of p-hydroxy diphenylmethane be incorporated in soap, for example, white olive castile soap, and the soap exposed to the action of atmospheric oxygen at 60° C. in such a way as to measure the oxygen absorbed by the soap it will be found that the treated soap absorbs oxygen at a very much slower rate than an untreated sample of the same soap. An inhibition of oxidation is secured by the use of p-hydroxy diphenylmethane in the soap resulting in an improvement in the aging qualities of the soap, which otherwise would have shown considerable deterioration and a development of rancidity.

*Example IV*

Cocoanut oil treated with 0.01% di-2-naphthol methane and exposed to the air at room temperature remains stable, sweet in odor, and essentially unchanged for a considerably longer period than untreated oil as determined by the sense of smell and the Kreis test.

Such compounds as di-2-naphthol methane,

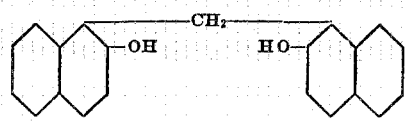

p:p'-dihydroxy diphenylmethane,

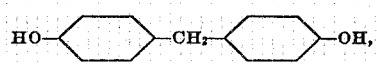

mm'-dihyroxy triphenylmethane,

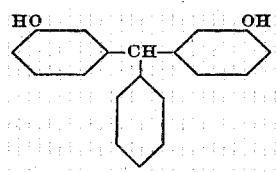

o-hydroxy diphenylmethane,

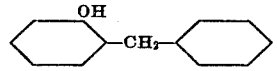

p-hydroxy diphenylmethane,

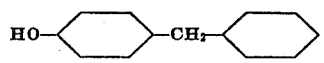

p-hydroxy diphenyl ether

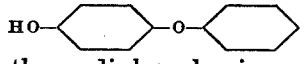

p:p'-diethoxy diphenylamine

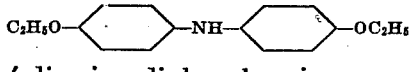

p:p'-diamino diphenyl amine

NH_2—⟨ ⟩—NH—⟨ ⟩—NH_2 have been used in lard and it was found that lard treated with these agents remained unaltered and free from rancidification for a considerably extended period over the time required for ordinary lard containing no anti-oxidant to become deteriorated and rancid. These substances may also be used with the same advantages in other animal fats, vegetable oils, and soap.

The description of the Kreis color reaction phloroglucinol test may be found in J. I. E. C. 15, 1051 (1923). Briefly it is as follows. One tenth of a gram of fat dissolved in 5 cc. ether is shaken with 5 cc. concentrated HCl. The mixture is then shaken with 5 cc. 1% ether solution of phloroglucinol. The development of a typical red color in the HCl is regarded as a positive reaction.

It will be understood that the concentrations of antioxidant agents may vary to secure protection against deterioration to a less and greater degree depending on the nature of the fat, fatty oil or soap in question, the nature of the antioxidant, and the actual concentration of agent used. Ordinarily the amount of the preservative used ranges from 0.001 to 1.% but this invention contemplates greater amounts if there be a particular need therefor, although so far it has not been found necessary to use more than the maximum amount stated above. The preservatives listed are not harmful so far as applicants are aware, but it is probably advisable to limit their use in edible materials to small quantities. Accordingly the particular conditions of each case will determine the amount needed.

Other compositions of the type described above but which contain certain substitutions of analogous groups in the general formula are also effective antioxidants. For example, we may introduce a third aryl group as in mm'-dihydroxy triphenyl methane, or replace the OH groups by alkoxy groups as in pp'-diethoxy diphenylmethane,

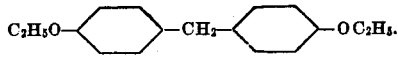

Further, in the type formula either R or R' or both may be a biphenyl nucleus thus giving a large number of compounds which are effective for the purpose mentioned. Such compounds, for example, include:

p-hydroxy p'-phenyl diphenylmethane,

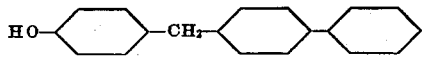

pp'-dihydroxy di-biphenylmethane,

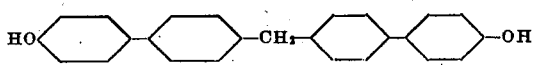

p-hydroxy biphenyl-2-naphthyl methane,

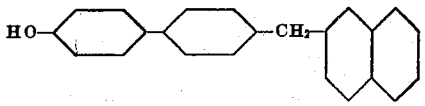

p-hydroxy biphenyl-2 (4-hydroxynaphthyl) methane

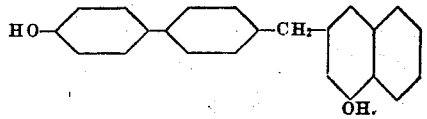

The aryl groups which may be substituted are not limited to phenyl, naphthyl, and biphenyl groups, but tolyl, xylyl, or any other aryl group may be used with effectiveness in compounds of the general type. It will, of course, be obvious that when the aryl groups have substituents other than hydroxy or alkoxy groups that the same must be of such nature as not to neutralize the hydroxy or alkoxy groups or nullify the inhibitive effect of the main nucleus and furthermore must be compatible with the object in view.

Other members of the general class described in this specification which may be used effectively are listed by way of example below:

sym. tri p-hydroxy triphenyl methane

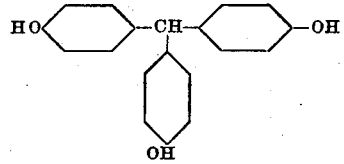

3-benzyl-2-naphthol,

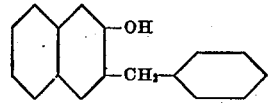

3:3'-dihydroxy diphenylmethane,

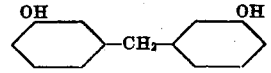

2:4'-dihydroxy diphenylmethane,

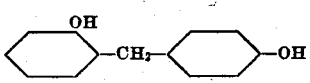

4:4'-dihydroxy 2:2'-dinaphthyl methane

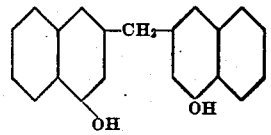

p-hydroxy phenyl-2-naphthyl methane,

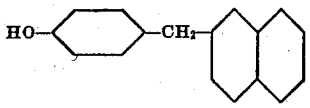

By the use of these retarding agents, autoxidation of these substances is effectively retarded, delayed or prevented in such a way that they remain sweet and apparently unchanged for considerably long periods of time. In addition to being very good inhibitors of deterioration and development of rancidity, the class of compounds disclosed herein is light-stable and gives rise to substantially no discoloration of white or light color fat and soap stocks. Some fats and soaps when exposed to the action of sunlight or ultra-violet light show considerable discoloration when they contain certain organic compounds as, for example, diphenylamine. This is avoided by the use of the compounds herein disclosed.

Of the oxy-diaryl-alkanes, the hydroxy-diaryl-alkanes are preferred. Especially good results have been obtained with para-hydroxy-diphenyl methane.

In this specification and claims the term "oxy-" is used generically and includes "hydroxy" and "alkoxy-".

By the term "auto-oxidizable" is meant the capacity for spontaneous chemical combination with or absorption of oxygen of the atmosphere under ordinary conditions.

As many apparently widely different embodiments of this invention may be made without departing from the spirit and scope thereof, it is to be understood that we do not limit ourselves to the specific embodiments thereof except as defined in the appended claims.

We claim:

1. A member of the group fats, fatty oils, fatty esters, fatty acids and fatty acid salts together with 0.001 to 0.1% para hydroxy diphenyl methane as an oxidation inhibitor and rancidification preventative.

2. In a method of retarding rancidification and inhibiting oxidation of a member of the group fats, fatty oils, fatty esters, fatty acids and fatty acid salts, the step of adding thereto 0.001 to 0.1% para hydroxy diphenyl methane.

3. A composition of matter including a substance of the group fats, fatty oils, fatty esters, fatty acids, and fatty acid salts together with a compound adapted to inhibit rancidification, said compound having a plurality of aryl groups joined to a nucleus and in which at least one of the aryl groups has a substitution radical attached thereto.

4. A composition of matter including a substance of the group fats, fatty oils, fatty esters, fatty acids, and fatty acid salts together with a compound adapted to inhibit rancidification, said compound having a plurality of aryl groups joined to a nucleus other than an amino group.

5. A composition of matter including a substance of the group fats, fatty oils, fatty esters, fatty acids, and fatty acid salts and a compound having a plurality of aryl groups joined to an alkane nucleus.

6. A composition of matter containing a compound capable of rancidification and as an oxidation inhibitor and rancidification preventative a compound of the hydroxy-diaryl-alkane class.

7. A composition of matter including a substance of the group fats, fatty oils, fatty esters, fatty acids, and fatty acid salts together with a compound adapted to inhibit rancidification, said compound having a plurality of aryl groups joined to an alkane nucleus in which at least one of the aryl groups is oxy-substituted.

8. A composition of matter including a substance of the group fats, fatty oils, fatty esters, fatty acids, and fatty acid salts and a compound having a plurality of aryl groups joined to an alkane nucleus in which at least one of the aryl groups is a phenyl radical, and in which at least one of the aryl groups is oxy-substituted.

9. A composition of matter including a substance of the group fats, fatty oils, fatty esters, fatty acids, and fatty acid salts and, in an amount less than 1.%, a compound having a plurality of aryl groups joined to an alkane nucleus in which at least one of the aryl groups is a phenyl radical, and in which at least one of the aryl groups is hydroxy substituted.

10. The method of preserving a compound tending to develop rancidity which comprises the step of adding to the compound to be preserved an oxy-diaryl alkane in an amount less than 1.%.

11. A composition of matter including a substance of the group oils, fats, fatty oils, fatty esters, fatty acids, and fatty acid salts and an oxy diaryl alkane compound.

12. A composition of matter including a substance of the group fats, fatty oils, fatty esters, fatty acids, and fatty acid salts and an oxy diphenyl alkane compound.

13. A composition of matter including a substance of the group fats, fatty oils, fatty esters, fatty acids, and fatty acid salts and a hydroxy diphenyl alkane compound.

14. A composition of matter including a substance of the group fats, fatty oils, fatty esters, fatty acids, and fatty acid salts and a compound of the type

HO—R—Alkyl—R′—Y in which R and R′ are aryl or aralkyl nuclei which may be alike or different and in which Y may be hydrogen, hydroxy or alkoxy.

15. A composition of matter including a substance of the group fats, fatty oils, fatty esters, fatty acids, and fatty acid salts and a compound of the type

HO—R—CH₂—R′—Y in which R and R′ are aryl nuclei which may be alike or different and in which Y may be hydrogen or hydroxy.

16. Animal fat together with a hydroxy diaryl alkane compound.

17. Lard together with a hydroxy diaryl alkane compound.

18. Vegetable fat together with a hydroxy diaryl alkane compound.

19. Cocoanut oil together with a hydroxy diaryl alkane compound.

20. Soap together with a hydroxy diaryl alkane compound.

21. The composition of claim 14 in which Y is alkoxy.

22. The composition of claim 14 in which Y is alkoxy and in which one of R and R' is naphthyl.

23. A composition of matter comprising a member of the group consisting of fats, fatty oils, fatty esters, fatty acids and fatty acid salts and 0.001 to 0.1% para-alkoxy-diphenyl-methane which is substantially identical with the product resulting from incorporating a para-alkoxy-diphenyl-methane in a member of the aforesaid group.

24. The art of retarding rancidification of a member of the group consisting of fats, fatty oils, fatty esters, fatty acids and fatty acid salts which comprises the step of incorporating an oxy-diaryl-alkane therein.

In testimony whereof we affix our signatures.

WILLIAM S. CALCOTT.
WILLIAM A. DOUGLASS.
HERBERT W. WALKER.